United States Patent [19]

Wachi et al.

[11] Patent Number: 4,553,931
[45] Date of Patent: Nov. 19, 1985

[54] HEAT-RESISTING FURNACE ROLL

[75] Inventors: Sadayuki Wachi, Wakayama; Kenichi Ohiwa, Osaka; Yasuo Shimada, Sennan; Takao Hino, Toyonaka, all of Japan

[73] Assignee: Sumitomo Metal Industries, Ltd., Osaka, Japan

[21] Appl. No.: 591,812

[22] Filed: Mar. 21, 1984

[30] Foreign Application Priority Data

Mar. 22, 1983 [JP] Japan .................................. 58-48376
Jan. 18, 1984 [JP] Japan .................................. 59-5682

[51] Int. Cl.$^4$ ........................ F27D 3/00; B65G 13/06
[52] U.S. Cl. ..................................... 432/246; 198/781
[58] Field of Search ................. 432/236, 246; 198/781

[56] References Cited

U.S. PATENT DOCUMENTS

| 3,051,460 | 8/1962 | Furczyk | 432/236 |
| 3,563,721 | 2/1971 | Ritter | 198/781 |
| 3,751,195 | 8/1973 | Snow | 432/236 |
| 4,242,782 | 1/1981 | Hanneken et al. | 432/236 |
| 4,343,395 | 8/1982 | Lippert et al. | 432/236 |

Primary Examiner—John J. Camby
Attorney, Agent, or Firm—Burns, Doane, Swecker & Mathis

[57] ABSTRACT

A heat-resisting furnace roll which comprises a support roll and a ceramic sleeve fitted over said support roll is disclosed. The ceramic sleeve fits loosely over the support roll even when said support roll exhibits maximum expansion in both its radial and longitudinal directions.

20 Claims, 4 Drawing Figures

4,553,931

HEAT-RESISTING FURNACE ROLL

BACKGROUND OF THE INVENTION

The present invention relates to heat-resisting furnace rolls used to transport the work such as steel sheets and the like through heating furnaces or heat-treating furnaces.

Rolls used to transport the work through heating furnaces or heat-treating furnaces such as reducing furnaces for performing chemical reduction prior to galvanizing, continuous annealing furnaces for electrical sheets, or annealing/pickling furnaces for stainless steel sheets are in most cases exposed to hot atmospheres in the range of 500° to 1300° C. In order to withstand such hot atmospheres, these conveying rolls are either made of heat-resisting materials such as Ni-Cr or Co-Cr base alloys, or consist of a support roll having a thermal sprayed coat of a ceramic material such as alumina or zirconia. One problem with heat-resisting steel rolls is that foreign materials from the work become fused to the roll surface and eat into the surface of the work to cause flaws in it. This problem is absent from rolls with a thermal sprayed ceramic coat. However, because of spalling of the ceramic coat, the service life of this type of roll is as short as 2 to 3 months. Furthermore, once spalling of the ceramic coat occurs, foreign materials can build up on the exposed surface of the support roll and cause the development of flaws in the work surface.

An improved heat-resisting roll that is said to have the ability to solve these problems has recently been proposed. This roll consists of a ceramic sleeve (sleeve made of a compacted and sintered ceramic powder) fixed to a support roll with keys or pins, and an integral combination of the support roll and ceramic sleeve ensures in-phase rotation wherein the peripheral speed of the roll is in synchronism with the work transport speed. Among the many ceramic materials proposed for use in the sleeve are alumina, silicon carbide, and silica.

The first proposal for such a ceramic sleeve was made more than ten years ago. However, because of its many defects, e.g. the insufficient mechanical strength of ceramic materials, cracking in or spalling of the sleeve due to the difference in thermal expansion coefficient from that of the metallic roll body, and vulnerability to thermal shock, a heat-resisting roll with this ceramic sleeve has yet to be fully commercialized. One reason is that a roll consisting of an integral combination of a support roll and a ceramic sleeve fitted over it experiences transverse deflection due to the difference in thermal expansion between the support roll and sleeve. Another reason is that the ceramic used is a brittle material and the sleeve soon becomes unserviceable due to brittle fracture. Furthermore, in a roll consisting of a support roll and a ceramic sleeve that is fitted over it and fixed thereto with keys or pins, impact resulting from the turning of the roll causes cracks to develop in the vicinity of a key hole or pin hole and such cracks propagate into the sleeve surface.

U.S. Pat. No. 3,751,195 discloses a heat-resisting roll consisting of a support roll surrounded by a porous sleeve of fused silica. However, the support roll and the sleeve are integrally coupled by keys in keyways so as to operate as a single unit, and cracking originates unavoidably in the vicinity of the key ways. Therefore, in spite of the many advantages of fused silica in the ceramic sleeve, the roll of that patent publication has not yet been commercialized.

A heat-resisting roll consisting of a support roll and a ceramic sleeve fitted over it and secured thereto is disclosed in Japanese patent publication No. 48086/1980. By using a sintered product of a "fine ceramic" powder comprising particles with an average size of 5–10 microns, this roll is capable of withstanding use in hot atmospheres in the range of 1500°–1600° C. The thermal expansion that will take place in such hot atmospheres is absorbed by two methos: (1) the ceramic sleeve is divided into segments in the axial direction of the roll and a clearance is provided at both ends of the roll; (2) a certain clearance is provided between the inner wall of the sleeve and the outer wall of the support roll along their entire length. In order to absorb the transverse deflection and the thermal expansion that will occur in the radial direction of the support roll, it is particularly important that a certain clearance be provided between the sleeve and support roll in their upper section. However, this arrangement necessitates a complex structure.

OBJECTS OF THE INVENTION

One object of the present invention is to provide a heat-resisting furnace roll that is free from the problems caused by the ceramic sleeves of conventional heat-resisting rolls and which can be manufactured on a commercial basis.

Another object of the present invention is to provide a heat-resisting furnace roll that has a very simple structure but can perform better than any conventional products.

A further object of the present invention is to provide a heat-resisting furnace roll that is particularly suitable for use as conveyer rolls in a reducing furnace for performing chemical reduction prior to molten zinc plating, a continuous annealing furnace for electrical sheets, or an annealing/pickling furnace for stainless steel sheets.

SUMMARY OF THE INVENTION

As already mentioned, all of the conventional heat-resisting rolls with a ceramic sleeve are characterized by the integral coupling of the sleeve and a support roll wherein the sleeve is secured to the latter by keys or pins. According to experiments conducted by the present inventors, most of these rolls became inoperable in a few days owing to nicks which developed in the vicinity of a key hole or cracking at a pin hole that resulted from the turning of the roll. It was soon learned that these problems are almost impossible to solve if the sleeve is secured to the support by keys or pins. Therefore, the present inventors took a different approach and sought for a means that was capable of transmitting satisfactorily the rotating force of the support roll to the ceramic sleeve without keys or pins. Contrary to the common thought in the art, it was found that this object could be attained by simply loosely fitting the ceramic sleeve over the support roll. The term "loosely fitting" means fitting with a clearance left between the ceramic sleeve and support roll.

Before starting those studies, several difficulties were expected: ceramics do not have a sufficient mechanical strength, so brittle fracture would occur in a "loosely fitted" ceramic sleeve; the rotating force of the support roll would not be transmitted to the "loosely fitted" sleeve; even if the rotating force were transmitted, some slip would occur and prevent smooth transmission necessary for turning the sleeve. However, these problems were entirely absent from the present invention and unexpectedly good results were obtained by using the heat-resisting furnace roll shown below.

Thus, the heat-resisting furnace roll of the present invention comprises a support roll and a ceramic sleeve fitted over the support roll and is characterized in that the ceramic sleeve remains loosely fitted over the support roll even when the support roll exhibits maximum thermal expansion in both its radial and longitudinal directions.

For the purpose of transmitting the rotating force of the support roll smoothly to the outer ceramic sleeve, at least one of the two sliding surfaces, for example, the inner surface of the ceramic sleeve, is preferably finished to a suitable roughness such that $R_{max} \geq 25$ μm. More preferably, both sliding surfaces, namely the inner surface of the sleeve and the outer surface of the support roll are finished to the above defined surface roughness.

The ceramic sleeve may be made of any material. However, since the heat-resisting roll of the present invention is intended for use in heating furnaces and heat-treating furnaces of the types mentioned above, the ceramic sleeve is preferably made of fused silica. The ceramic sleeve is fabricated from a ceramic powder that is compacted and sintered by suitable conventional techniques. If fused silica particles are used, a blend with a suitable binder is compacted and sintered to fabricate the desired sleeve.

According to the present invention, the ceramic sleeve is loosely fitted over the support roll so that a certain clearance always exists between the sleeve and support roll and effectively serves to absorb the thermal expansion of the latter. The bending stress $\delta$ (kgf/mm²) applied to the support roll is preferably not more than 4.0. The average clearance $\alpha$ (the distance between the outer surface of the support roll and the inner surface of the sleeve when the axes of the support roll and sleeve are aligned) is preferably not smaller than 1.0. More preferably, the two parameters satisfy the relation $\alpha \geq 0.2\delta^2 + 1$. The bending stress $\delta$ depends on various factors such as the weight of the support roll, the weight of the sleeve, the weight of the work (steel sheet) and the diameter of the support roll, and is given by the following formula:

$$\delta = M_{max}/Z$$

wherein
$M_{max} = l_1/2(w_1 l_1/2 + w_2 l_2/2 + w_3 l_3/2)$
$Z = \pi/32[(do_1^4 - di_1^4)/do_1]$ The $l_1$, $l_2$ and $l_3$ are the distance between bearings at roll ends, the length of the sleeve, and the width of the steel sheet, respectively.

The $w_1$, $w_2$ and $w_3$ respectively indicate the weights of the support roll, the sleeve, and the steel sheet and are calculated according to the following equations:

$w_1(kgf/mm) = \pi/4(do_1^2 - di_1^2)r_1$ $w_2(kgf/mm) = \pi/4(do_2^2 - di_2^2)r_2$ $w_3(kgf/mm) = s \times r_3 \times t$ wherein
 $do_1$: outside diameter of the support roll;
 $di_1$: inside diameter of the support roll (if hollow);
 $do_2$: outside diameter of the sleeve;
 $di_2$: inside diameter of the sleeve;
 $r_1$: specific gravity of the support roll;
 $r_2$: specific gravity of the sleeve;
 $r_3$: specific gravity of the steel sheet;
 t: thickness of the steel sheet; and
 s: roll span.

According to the present invention, the ceramic sleeeve is loosely fitted over the support roll so as to absorb the thermal expansion that occurs in the radial and longitudinal directions of the support roll. By so doing, the transverse deflection of the support roll and the difference in thermal expansion between the support roll and the sleeve can be effectively absorbed by the clearance between the two members. Furthermore, the sleeve need not be fixed to the support roll by keys, pins, or other fastening devices, and therefore the sleeve is entirely free of nicks or cracks that would otherwise occur in the vicinity of such fasteners.

If the support roll is rotated in synchronism with the line speed, the friction between the outer surface of the support roll and the inner surface of the sleeve causes the sleeve to rotate together with the support roll. On the other hand, if the support roll is not externally driven, the work being transported causes the entirety of the heat-resisting roll (including the support roll) to rotate. In either case, there will be no abrasion of the surface of the steel sheet. If a steel sheet or other work is rapidly accelerated or decelerated or if the support roll is brought to a sudden stop, slippage occurs between the support roll and the loosely fitted sleeve and no impact that could lead to brittle facture is directly transmitted to the sleeve.

DETAILED DESCRIPTION OF THE PREFERRED EMBODIMENTS

One preferred embodiment of the heat-resisting roll according to the present invention is hereinunder described with reference to the accompanying drawings wherein like numerals identify like parts.

Figure 1:
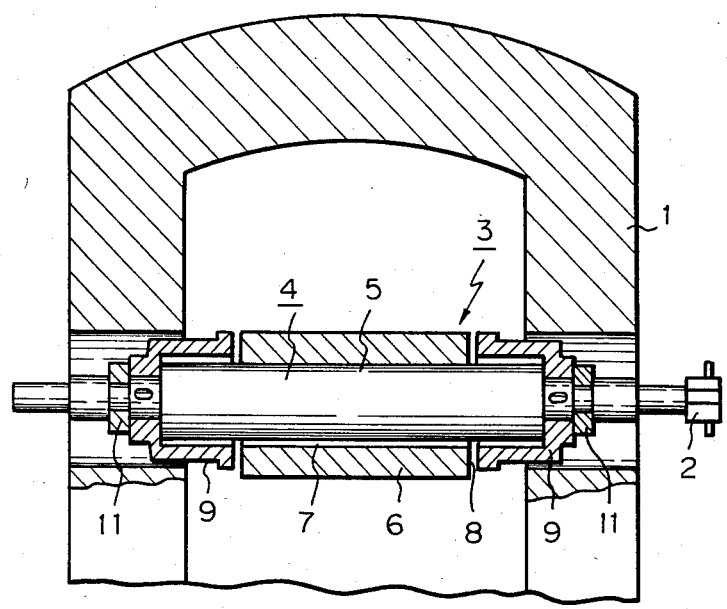
FIG. 1 shows schematically the heat-resisting furnace roll of the present invention as used in a hearth roller heating furnace.

In FIG. 1, a hearth roller heating furnace generally indicated by reference numeral 1 contains a train of heat-resisting rolls 3 that are designed to rotate in synchronism with the line speed by means of a suitable drive mechanism 2 such as a chain or sprocket. According to the present invention, each of the heat-resisting furnace rolls 3 consists of a support roll 4 that is driven so as to rotate in synchronism with the line speed and a heat-resisting ceramic sleeve 6 that is loosely fitted over the body 5 of that support roll.

The work (not shown) supported by the heat-resisting rolls 3 is carried on the ceramic sleeve 6 that is caused to rotate by the support roll 4. In an entirely unconventional manner, the rotating force of the support roll 4 is transmitted by friction to the ceramic sleeve 6 rather than by fasteners such as pins or keys.

Therefore, nicks or cracks that can occur in the vicinity of such fasteners are entirely absent from the heat-resisting roll of the present invention. Preferably, at least one of the two sliding surfaces, i.e. the inner surface of the sleeve and the outer surface of the support roll, is finished to such a roughness that $R_{max} \geq 25$ μm. By suitable adjustment of the roughness of the outer surface of the body 5 of the support roll 4 or the roughness of the inner surface of the sleeve 6, or alternatively, by adjusting the weight of the sleeve, a sufficient friction is developed between the support roll 4 and the sleeve 6 to enable the sleeve 6 to rotate in synchronism with the line speed. Therefore, the sleeve 6 is also free from brittle fracture that would occur due to impact from the driving of the sleeve by means of keys or pins.

Figure 2:
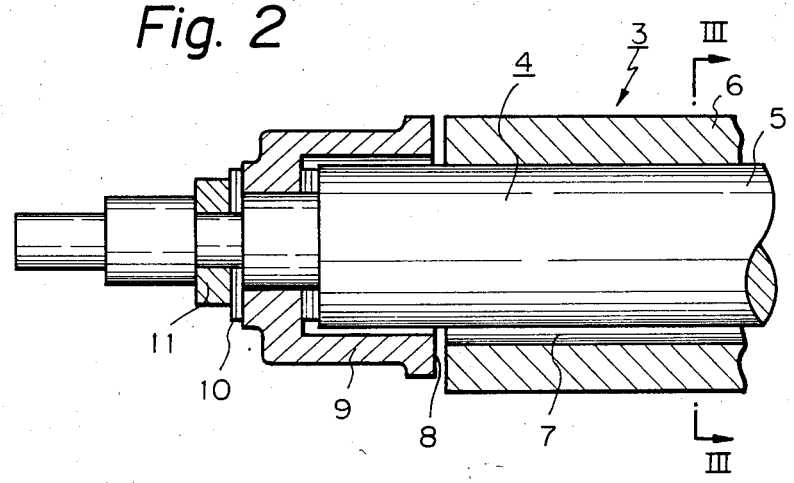
FIG. 2 is an enlarged view of a portion of the roll of FIG. 1.

As another feature of the present invention, a radial clearance 7 is provided between the outer periphery of the support roll 4 and the inner periphery of the ceramic sleeve 6. This clearance effectively absorbs the thermal expansion of the support roll 4 that occurs in its radial direction, as well as the resulting transverse deflection of the support roll 4. Furthermore, as shown in FIG. 2, a stopper 9, which may be in the form of a removable cap (as shown in the figures) or in the form of a position-adjustable disk, is disposed on both axial ends of the support roll 4 with an axial clearance 8 left therebetween, and a fastener 11 is secured to the stopper 9 with an annular spacer 10 disposed therebetween. By this arrangement, the allowed range of the axial movement of the ceramic sleeve 6 can be properly adjusted. The size of the axial clearance 8 should be sufficient to take up the thermal expansion of the support roll 4 that occurs in its axial direction during service.

The average value of the radial clearance 7 is generally the sum of the theoretically possible thermal expansion and deflection, plus an additional allowance of at least 1 mm. The same applies to the axial clearance 8, although this clearance is freely adjustable by changing the position of the stopper 9.

Figure 3:
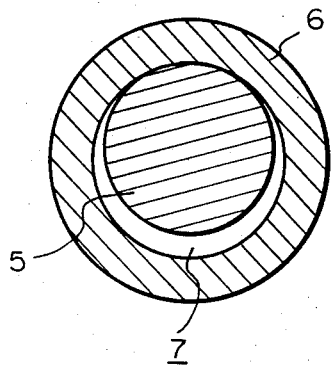
FIG. 3 is a cross sectional view taken along line III-—III of FIG. 2.
Figure 4:
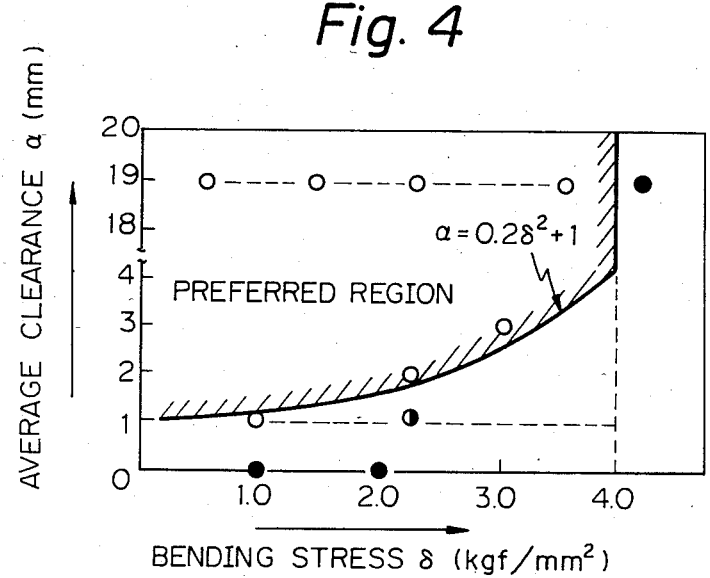
FIG. 4 is a graph showing the average clearance plotted against the bending stress applied to the support roll.

Heat-resisting rolls having the construction shown in FIGS. 1 to 3 were subjected to a running operation test in a heating furnace under a constant load and checked every month for the occurrence of brittle fracture in the ceramic sleeve. The profile of the average clearance vs the bending stress applied to the support roll at the furnace temperature is shown in FIG. 4. The bending stress included stress due to the weights of the support roll and the sleeve. The solid dots in FIG. 4 refer to samples in which brittle fracture was detected in the sleeve by inspection in the first month. The open dots indicate samples which underwent use for a year and a half without developing brittle fractures in the sleeve. The semi-solid dots represent samples which were found to have developed brittle fractures only in the inspection in the sixth month. The hatched area indicates a preferred region where the rolls could be operated most satisfactorily. The service life of the conventional ceramic sleeves is only a few days, so it is indeed a great improvement that even the most poorly performing ceramic sleeves according to the present invention could withstand continued use for a month. On the other hand, the best sleeves could be used for as long as a year and a half without brittle fracture, and this is also of great commercial significance.

The materials and other specifications of the heat-treating rolls tested were as follows.

Ceramic sleeve

Material: sintered product of fused silica (99.7% $SiO_2$ and 0.05% $Al_2O_3$)
Thickness: 50 mm
I.D.: 200 mm
O.D.: 300 mm
Length: 1800 mm
Surface roughness: 30–50 μm Support roll Material: Ni-Cr alloy (50% Ni, 35% Cr, 15% W)
O.D: 176–195 mm
Body length: 2500 mm (between bearings at roll ends)
Surface roughness: 15–25 μm As will be apparant from FIG. 4, brittle fracture in the sleeve can be prevented by ensuring that the average clearance $\alpha$ (mm) in the radial direction is not smaller than 1.0 and that the bending stress $\delta$ (kgf/mm$^2$) applied to the support roll is not greater than 4.0. More satisfactory results are obtained by setting the average clearance in the radial direction so that the two parameters satisfy the following relation: $\alpha \geq 0.2\delta^2 + 1$.

The present inventors confirmed in a series of experiments that this relation could be established for heat-resisting sleeves having common shapes and dimensions. It was also confirmed that the relation $\delta \leq 4$ (kgf/mm$^2$) could be reasonably satisfied by making a support roll of conventional materials such as heat-resisting alloys (e.g. Ni-Cr) and stainless steel.

As already mentioned, the stopper 9 may be either cap-shaped to ensure easy removal or may be an unremovable disk that is position-adjustable. As shown in FIG. 2, the axial moving range of the ceramic sleeve 6 is determined by the distance between the cap-shaped stopper 9 and the body 5 of the support roll 4. This distance can be freely adjusted by changing the thickness of the annular spacer 10 placed between the stopper 9 and the fastener 11.

The support roll 4 may be provided with a passage for cooling fluid through its center along its entire length. A suitable cooling fluid such as water can be caused to flow through this channel for the purpose of minimizing the transverse deflection of the support roll.

In another embodiment, the ceramic sleeve 6 may be divided into segments of a suitable size in the axial direction in order to prevent breakage due to bending caused by the thermal expansion of the sleeve. More specifically, a plurality of sleeves each having a short cylindrical form with chamfered ends are loosely fitted over the body 5 of the support roll 4 in its longitudinal direction.

Having the construction described above, the heat-resisting roll of the present invention is entirely free from damage to the sleeve owing to transverse deflection of the support roll or accidental impact of the sleeve. This enables the extended service of the sleeve and as a result, an industrially feasible heat-resisting roll with a ceramic sleeve can be provided by the present invention.

Although the present invention has been described with respect to preferred embodiments, it is to be understood that variations and modifications may be employed without departing from the concept of the invention as defined in the following claims.

What is claimed is:

1. A heat resisting furnace roll for transporting metal sheets, comprising a support roll and a ceramic sleeve fitted over said support roll to define a radial clearance therebetween wherein said ceramic sleeve is loosely fitted over said support roll even when said support roll exhibits maximum thermal expansion in both radial and longitudinal directions, said radial clearance provided between the outer periphery of the support roll and the inner periphery of the ceramic sleeve, and an axial clearance provided at both axial ends of said ceramic sleeve.

2. A heat-resisting furnace roll as defined in claim 1, wherein a stopper in the form of a removable cap is disposed on both axial ends of the support roll with said axial clearance left therebetween.

3. A heat-resisting furnace roll as defined in claim 2, wherein said stopper is in the form of a position-adjustable disk.

4. A heat-resisting furnace roll as defined in claim 1 wherein at least one contacting surface between the peripheral surface of said support roll and the inner surface of said ceramic sleeve is surface finished to a surface roughness of $R_{max} \geqq 25$ μm.

5. A heat-resisting furnace roll as defined in claim 1 wherein said ceramic sleeve is made of fused silica.

6. A heat-resisting furnace roll as defined in claim 5, wherein the support roll is made of Ni-Cr alloy or stainless steel.

7. A heat-resisting furnace roll as defined in claim 1, wherein the bending stress ($\delta$, kgf/mm$^2$) which is imposed on said support roll during working and an average clearance ($\alpha$, mm) in the radial direction between said support roll and said ceramic sleeve satisfy the following relationship:

$$\alpha \geqq 1 \text{ and } \delta \leqq 4.0.$$

8. A heat-resisting furnace roll as defined in claim 7, wherein the relationship between the bending stress and the average clearance is:

$$\alpha \geqq 0.2 \times \delta^2 + 1.$$

9. A heat resisting furnace roll as defined in claim 1, wherein said metal sheet is a steel sheet.

10. A heat resisting furnace roll as defined in claim 1, wherein said furnace roll is for use in a reducing furnace for performing chemical reduction prior to molten zinc plating.

11. A heat resisting furnace roll as defined in claim 1, wherein said furnace roll is for use in a continuous annealing furnace for electrical sheets.

12. A heat resisting furnace roll as defined in claim 1, wherein said furnace roll is for use in an annealing/picking furnace.

13. A heat-resisting furnace roll which comprises a support roll and a ceramic sleeve fitted over said support roll, characterized in that said ceramic sleeve is a sintered product of fused silica and remains loosely fitted over said support roll even when said support roll exhibits maximum thermal expansion in both its radial and longitudinal directions.

14. A heat-resisting furnace roll as defined in claim 13, wherein a radial clearance is provided between the outer periphery of the support roll and the inner periphery of the ceramic sleeve, and an axial clearance is provided at both ends of said ceramic sleeve.

15. A heat-resisting furnace roll as defined in claim 14, wherein a stopper in the form of a position-adjustable cap is disposed on both axial ends of the support roll with said axial clearance left therebetween.

16. A heat-resisting furnace roll as defined in claim 15, wherein said stopper is in the form of a position-adjustable disk.

17. A heat-resisting furnace roll as defined in claim 13, wherein at least one contacting surface between the peripheral surface of said support roll and the inner surface of said ceramic sleeve is surface finished to a surface roughness of $R_{max} \geqq 25$ μm.

18. A heat-resisting furnace roll as defined in claim 13, wherein the support roll is made of Ni-Cr alloy or stainless steel.

19. A heat-resisting furnace roll as defined in claim 13, wherein the bending stress ($\delta$, kgf/mm$^2$) which is imposed on said support roll during working and an average clearance ($\alpha$, mm) in the radial direction between said support roll and said ceramic sleeve satisfy the following relationship:

$$\alpha \geqq 1 \text{ and } \delta \leqq 4.0.$$

20. A heat-resisting furnace roll as defined in claim 19, wherein the relationship between the bending stress and the average clearance is:

$$\alpha \geqq 0.2 \times \delta^2 + 1.$$

* * * * *